United States Patent Office 2,977,188
Patented Mar. 28, 1961

2,977,188

METHOD OF PURIFYING THIOCYANATE SOLUTIONS

Victor C. Serreze, Jr., Cos Cob, Conn., assignor to American Cyanamid Company, New York, N.Y., a corporation of Maine No Drawing. Filed Apr. 23, 1958, Ser. No. 730,247

5 Claims. (Cl. 23—75)

This invention relates broadly to a treatment of fluids and, more particularly, to the purification of thiocyanate solutions, especially such solutions which are to be used or re-used as the solvent component of a spinning solution, e.g., one comprised of a polymer of acrylonitrile.

In the production of staple fibers, continuous filaments (mono- and multifilaments), rods, tubes, films, ribbons, sheets, and other shaped articles from a solution of a polymer of acrylonitrile dissolved in a concentrated aqueous solution of sodium thiocyanate or other water-soluble thiocyanate (with or without one or more other additives such as a lower monohydric alcohol), dilute solutions of the thiocyanate are obtained. (Such processes are described in, for example, Cresswell U.S. Patents 2,558,730, –1, –2, –4, and –5, all dated July 3, 1951; Cresswell and Wizon U.S. Patent No. 2,558,733 and Pollard U.S. Patent No. 2,558,781, each dated July 3, 1951; and British Patents 714,530, 715,915, 729,472, and 732,135.) It is important to the economics of the process that such dilute solutions be concentrated and the concentrated thiocyanate solution then reused in the process. Otherwise the manufacturing costs may be prohibitive from a competitive standpoint.

In making polyacrylonitrile fibers from solutions of the kind described in the preceding paragraph, and specifically from a polymer of acrylonitrile dissolved in a concentrated aqueous solution of sodium thiocyanate, it was discovered that, after spinning for varying periods of time, the spinnerette openings became obstructed, causing unsatisfactory spinning operations and the production of fiber of inferior quality, and eventually the shut-down of the spinning device for replacement of the spinnerette with one having unobstructed openings. The contaminated spinnerette then had to be cleaned. This was costly and time-consuming. Analytical studies revealed that the material that was obstructing the spinnerette holes comprised mainly sodium sulfate, which also was found to be present in the spinning solution or "dope" and, also, in the thiocyanate solution in which the acrylonitrile polymer was dissolved to make the dope. (The sodium sulfate may result, for example, from sulfoxy compounds used as the reducing agent of a redox-catalyst system employed in the polymerization operation.) Other impurities found in recovered sodium thiocyanate solution include $CO_3^=$, $Cl^-$, $CN^-$, $NO_3^-$, $Fe^{+3}$, $Al^{+3}$ and $Cu^{+2}$.

The presence of sodium sulfate in the dilute (e.g., 2 to 20% by weight) sodium thiocyanate solution is also objectionable when concentrating the solution for re-use in the process, since it causes scale build-up in evaporators during evaporation of the solution.

One solution to the above-described problem, which is solely a particular kind of a chemical treatment, is disclosed and claimed in the copending application of Victor C. Serreze, Jr., and Witold R. Kocay, Serial No. 689,785, filed October 14, 1957. The present invention is a different solution to the same problem.

It is a primary object of the present invention to provide a simple and inexpensive method of removing impurities comprising mainly sodium sulfate, as well as other impurities such as those mentioned above, from an aqueous solution of sodium thiocyanate containing the same, thereby obviating the difficulties set forth above.

Other objects of the invention will be apparent to those skilled in the art from the following more detailed description and the illustrative examples.

The objects of the invention are attained by evaporating water under heat (e.g., at a temperature of from 50° C. to 130° C., and preferably under sub-atmospheric pressure, i.e., under vacuum) from a 2% to 20%, by weight, aqueous solution of sodium thiocyanate containing sodium sulfate and other impurities. The evaporation is caused to take place, preferably continuously, until the solution contains between about 56% and about 62% by weight of NaSCN. During evaporation of the water, that part of the total amount of sodium sulfate which is in excess of the solubility of $Na_2SO_4$ in the concentrated thiocyanate solution is precipitated therefrom. The resulting concentrated solution of sodium thiocyanate is then cooled to a temperature below 38° C. but above the freezing point of the concentrated thiocyanate solution. This causes an additional amount of sodium sulfate to separate, more particularly crystallize, from the cooled solution, after which it is removed from the solution, e.g., by filtration, centrifuging, decanting, etc.

The evaporation step briefly described above can be effected in commercially available evaporators, using suitable materials of construction that will resist the corrosive influences of aqueous sodium thiocyanate solutions. The evaporation may be effected in stages, during which part of the water is removed at atmospheric pressure and the remainder at reduced pressure, e.g., at a pressure in the final stage that may be as low, if desired, as 10 mm. Hg pressure (or even lower) but which generally is not lower than about 150 mm. Hg pressure, at which pressure the final temperature will generally range between about 110° C. and 130° C.

A modification of the present invention has as its primary object a preliminary chemical treatment of the starting 2% to 20%, by weight, aqueous solution of sodium thiocyanate whereby precipitation in the evaporator (i.e., on the evaporator surfaces) of that part of the total amount of sodium sulfate which is in excess of the solubility of $Na_2SO_4$ in the concentrated thiocyanate solution is obviated or minimized. At least part of this precipitated sodium sulfate forms a scale on the evaporator surfaces. As a result it is necessary, in order to maintain the efficiency of the evaporator, to discontinue operation of the evaporator and remove the aforementioned scale. This is costly and time-consuming.

The preliminary chemical treatment mentioned in the preceding paragraph comprises admixing with the starting 2% to 20%, by weight, aqueous solution of sodium thiocyanate containing sodium sulfate and other impurities an amount of a water-soluble barium compound which is substantially less than the chemical equivalent amount required for converting all of the said sodium sulfate to barium sulfate, but which is sufficient to prevent the precipitation of sodium sulfate during subsequent concentration under heat of the said thiocyanate solution. Thereafter the precipitate (precipitated material) comprising barium sulfate is separated from the resulting thiocyanate solution, e.g., by filtration, centrifuging, decanting, etc.

To the best of my knowledge and belief, any water-soluble barium compound can be used. Illustrative examples of such compounds are barium hydroxide $[Ba(OH)_2 \cdot 8H_2O]$ barium nitrate, barium acetate, barium thiocyanate, barium benzoate, barium nitrite, barium butyrate, barium chlorate, barium formate, barium chloride, etc. It is not necessary that the chosen water-soluble barium compound be one that has been preformed before addition to the aqueous thiocyanate solution. Instead one can use reagents that will react with each other to form a water-soluble barium compound in situ. Examples of such reagents are barium hydroxide and ammonium thiocyanate which can be added to the aqueous thiocyanate solution and will react with each other to form barium thiocyanate in situ.

The method of this invention is especially applicable in the treatment of dilute solutions of sodium thiocyanate, that is, solutions containing from about 2% to about 20%, more particularly from about 3% to about 15%, by weight of NaSCN, and which also contain sodium sulfate as an impurity. However, aqueous sodium thiocyanate solutions containing above 20% by weight of NaSCN (e.g., up to about 55% by weight of NaSCN) and containing $Na_2SO_4$ as an impurity also can be effectively treated in accordance with this invention.

It is important that one determine, as by known chemical or other analytical techniques, the amount of sodium sulfate which is present in the sodium thiocyanate solution prior to adding the water-soluble barium compound thereto. As stated above, the amount of the latter should be substantially less than the chemical equivalent amount required for converting all of the sodium sulfate to barium sulfate, but which is sufficient to prevent the precipitation of sodium sulfate during subsequent concentration under heat of the said thiocyanate solution. Knowing the total amount of sodium sulfate in the starting thiocyanate solution and from a previously prepared graph showing the solubility of $Na_2SO_4$ in aqueous NaSCN over the range of concentrations and temperatures encountered in the concentration of the thiocyanate solution, one can calculate the amount of water-soluble barium compound that will remove enough sodium sulfate so that none (or no appreciable amount) of the latter will be precipitated on the evaporating surfaces of the evaporator.

The temperature of treating with the water-soluble barium compound is not critical and may range, for example, from 10° to 30° C. or at higher temperatures up to the boiling temperature of the thiocyanate solution at atmospheric pressure.

At any stage of the treatment of the sodium thiocyanate solution with the water-soluble barium compound, or at the end of the treatment with the said compound, there may be added to the thiocyanate solution a finely divided adsorbent, more particularly a decolorizing agent, e.g., finely divided activated carbon, bone black, certain natural or activated bleaching clays, etc., and/or a filter aid, e.g., finely divided diatomaceous earth. The adsorbent, e.g., a decolorizing agent, improves the color of the thiocyanate solution and adsorbs other impurities such, for example, as hydroxides of iron and copper that may be present. Removal of such impurities decreases color formation in aqueous sodium thiocyanate solutions as well as in the final polyacrylonitrile fiber made from the spinning solution.

The amount of adsorbent and/or filter aid employed is not critical and may be varied as desired or as conditions may require, e.g., from 0.05% to 1 or 2% by weight of the thiocyanate solution.

In order that those skilled in the art may better understand how the present invention can be carried into effect the following examples are given by way of illustration and not by way of limitation. All parts and percentages are by weight unless otherwise stated. In all examples the content of sodium sulfate in the thiocyanate solution was determined prior to the processing operations described in the individual example.

*Example 1*

A dilute aqueous solution of sodium thiocyanate containing about 10% NaSCN and 0.37 lb. of $Na_2SO_4$ per 100 lbs. of actual NaSCN is evaporated to a concentration of about 61% NaSCN under a reduced pressure of 200 mm. Hg pressure in the final stages of the concentration, and at a maximum liquor temperature in the final stages of the concentration of about 120° C. At this temperature only 0.29 lb. of $Na_2SO_4$ per 100 lbs. of actual NaSCN is held in solution. This means that 0.08 lb. of $Na_2SO_4$ per 100 lbs. of actual NaSCN, or 21% of the total sulfate initially present, precipitates out in the evaporator.

The resulting concentrated solution of sodium thiocyanate is run into a crystallizer and cooled to 35° C. About 0.22 lb. of $Na_2SO_4$ per 100 lbs. of actual NaSCN crystallizes out of solution, and is removed by filtration. The amount removed in this way is 60% of the $Na_2SO_4$ present in the initial solution, and a total of 81% of the $Na_2SO_4$ initially present is removed by the combined steps. The purified NaSCN solution can be diluted with water to any desired strength required for use as a solvent for a polymer of acrylonitrile in making a spinning solution or for any other purpose.

*Example 2*

A polyacrylonitrile "dope" (spinning) solution prepared by dissolving about 10% of a polymer of acrylonitrile in about 48% sodium thiocyanate nearly saturated with sodium sulfate is extruded through a spinnerette into a coagulating bath comprised of a 10% aqueous solution of NaSCN and maintained at a temperature of about 1° C. Equilibrium of the coagulating solution is attained with the result that the sodium sulfate level reaches a level of 0.60 lb. of $Na_2SO_4$ per 100 lbs. of actual NaSCN. Recovery of sodium thiocyanate is achieved by evaporation of the water under vacuum in an evaporator at approximately 200 mm. Hg pressure. Evaporation is carried out to a final concentration of 56.5% aqueous sodium thiocyanate. The final liquor temperature in the evaporator at this concentration is approximately 110° C. At 110° C. only 0.32 lb. sodium sulfate per 100 lbs. of sodium thiocyanate remains in solution with the result that 0.28 lb. of sodium sulfate per 100 lbs. of actual sodium thiocyanate precipitates out in the evaporator. This corresponds to about 46.7% removal of the original total sodium sulfate in the starting thiocyanate solution.

The concentrated thiocyanate solution or slurry is pumped from the evaporator and fed to a crystallizer. The slurry is cooled to 21° C. (3° C. above the freezing point of 56.5% aqueous sodium thiocyanate), whereupon an additional amount of $Na_2SO_4$ separates in crystalline form. The resulting slurry is filtered. The mother liquor now contains 0.11 lb. of sodium sulfate per 100 lbs. of actual sodium thiocyanate. Thus 0.21 lb. of sodium sulfate per 100 lbs. of sodium thiocyanate has been removed in the crystallizer or 35% of the total original sodium sulfate. Total sodium sulfate removal in the two steps is, therefore, 81.7%.

*Example 3*

A polyacrylonitrile dope or spinning solution prepared by dissolving about 10% of a polymer of acrylonitrile in about 46% aqueous sodium thiocyanate solution containing about 0.65 lb. of $Na_2SO_4$ per 100 lbs. of actual NaSCN is extruded through a spinnerette into a coagulating bath comprised of a 7% aqueous solution of NaSCN and maintained at a temperature of about 1° C. Equilibrium of the coagulating solution is attained with the result that the latter contains about 0.65 lb. of $Na_2SO_4$ per 100 lbs. of actual NaSCN.

The dilute thiocyanate solution from the coagulating bath is evaporated to 59% NaSCN concentration in an evaporator under increasingly higher vacua which, in its final stages, corresponds to 200 mm. Hg pressure. At this point the liquor temperature corresponds to 115° C. and only 0.30 lb. of sodium sulfate per 100 lbs. of actual sodium thiocyanate remains in solution. The result is the precipitation of 0.35 lb. of sodium sulfate per 100 lbs. of sodium thiocyanate in the evaporator, which represents the removal of about 53.6% of the total original $Na_2SO_4$ content.

After filtration of the hot liquor from the evaporator the effluent is allowed to cool in a crystallizer, with seeding with a few crystals of sodium sulfate, to a temperature of 25° C. (3° C. above the freezing point of 59% sodium thiocyanate), and the slurry containing the $Na_2SO_4$ that has crystallized out is filtered. The filtrate has a sulfate content of 0.07 lb. of sodium sulfate per 100 lbs. of actual sodium thiocyanate. Removal in this step amounts to 35.4% of the total original sodium sulfate. Total removal of $Na_2SO_4$ in the combined steps amounts to about 89% of the original amount present in the thiocyanate solution.

Example 4

A polyacrylonitrile spinning solution prepared by dissolving about 10% of a polymer of acrylonitrile in about 50% aqueous sodium thiocyanate solution containing about 0.52 lb. of $Na_2SO_4$ per 100 lbs. of actual NaSCN is extruded through a spinnerette into a coagulating bath comprised of a 15% aqueous solution of NaSCN and maintained at a temperature of about 1° C. Equilibrium of the coagulating solution is attained with the result that the latter contains about 0.52 lb. of $Na_2SO_4$ per 100 lbs. of actual NaSCN.

The dilute thiocyanate solution from the coagulating bath is evaporated to 62% NaSCN concentration in essentially the same manner described under Example 3, the final liquor temperature being 120° C. At this temperature 0.28 lb. of $Na_2SO_4$ per 100 lbs. of actual NaSCN remains in solution, and 0.24 lb. of $Na_2SO_4$ per 100 lbs. of actual NaSCN is precipitated out in the evaporator. This corresponds to the removal of about 46% of the total original $Na_2SO_4$ content.

After filtration of the hot liquor, the filtrate is cooled in a crystallizer to a temperature not lower than 35° C. The amount of $Na_2SO_4$ which crystallizes out in this stage is 0.23 lb. per 100 lbs. of actual NaSCN, or about 44% of the total content of $Na_2SO_4$ in the original NaSCN solution. Total removal of $Na_2SO_4$ in the combined steps amounts to about 90% of the original amount present in the thiocyanate solution.

Example 5

An 8% aqueous NaSCN solution having an equilibrium $Na_2SO_4$ content of 0.37 lb./100 lbs. actual NaSCN is treated with 0.00063 lb. mole of $Ba(NO_3)_2$, and with ammonium hydroxide to bring the pH to 8. Activated carbon and diatomaceous earth (filter aid) are added, and the resulting slurry is agitated for one hour, and then filtered. The $Na_2SO_4$ content of the NaSCN solution is now 0.28 lb./100 lbs. actual NaSCN, which corresponds to the removal of 24.0% of the original $Na_2SO_4$ content. Evaporation of the dilute NaSCN solution is carried out in an evaporator as in the previous examples. In this case the vacuum in the final stage corresponds to 200 mm. Hg pressure, and evaporation is continued to a final concentration of 59% NaSCN. With the liquor temperature at 115° C. in the final stage, 0.30 lb. $Na_2SO_4$/100 lbs. actual NaSCN remains in solution.

The concentrated NaSCN solution is slowly cooled in a holding tank with a few crystals of $Na_2SO_4$ added as seed. Cooling to 28° C. reduces the $Na_2SO_4$ solubility to 0.08 lb. $Na_2SO_4$/100 lbs. actual NaSCN. The crystallized $Na_2SO_4$ is removed by filtration. Removal by crystallization amounts to 54%. Total removal by both steps amounts to 78%.

Example 6

A 12% aqueous NaSCN solution containing at equilibrium 0.35 lb. $Na_2SO_4$/100 lbs. actual NaSCN is treated with 0.00056 lb. mole of $Ba(SCN)_2$, and with ammonium hydroxide to adjust the pH to 8. Activated carbon and diatomaceous earth are added and the resulting slurry is agitated for 1.5 hours and then filtered. The residual $Na_2SO_4$ in the filtrate is 0.271 lb./100 lbs. actual NaSCN. This corresponds to the removal of 22.5% of the original $Na_2SO_4$, and a sulfate removal efficiency of the chemical treatment of 98%.

Evaporation to 62% NaSCN is carried out as in prior examples at 200 mm. Hg pressure in the final stage and a final liquor temperature of 122° C. At 122° C., $Na_2SO_4$ is soluble in the hot, concentrated thiocyanate solution to the extent of 0.285 lb./100 lbs. actual NaSCN. Slow cooling of the hot concentrated liquor is conducted in a hold tank with a few crystals of $Na_2SO_4$ added as seed. At a final temperature of 37° C., the liquor holds 0.065 lb. $Na_2SO_4$/100 lbs. actual NaSCN. The slurry is filtered to remove the crystalline $Na_2SO_4$ that separates, and removal of sulfate by crystallization amount to 59% of the original. Total removal of $Na_2SO_4$ in the combined steps is 81.5% of the total original amount present in the dilute thiocyanate solution.

Example 7

A polyacrylonitrile spinning solution prepared by dissolving a polymer of acrylonitrile in a 48% aqueous NaSCN solution and which contains 0.35 lb. $Na_2SO_4$/100 lbs. actual NaSCN is extruded into a coagulating bath comprised of a 10% aqueous NaSCN solution. Equilibrium is obtained in the coagulating bath in which the $Na_2SO_4$ content is also 0.35 lb./100 lbs. actual NaSCN.

To the dilute NaSCN solution from the coagulating bath is added 0.00049 lb. mole of $Ba(COCH_3)_2$, and $NH_4OH$ to bring the solution to a pH of 8. The solution is agitated for one hour while admixed with activated carbon and diatomaceous earth which have been added thereto, and is then filtered. The filtrate contains 0.285 lb. $Na_2SO_4$/100 lbs. actual NaSCN, which corresponds to an efficiency of 94% for sulfate removal by barium acetate treatment, or a removal of about 18.6% of the original total $Na_2SO_4$ content of the NaSCN solution.

The solution is evaporated, as in prior examples, to 61% NaSCN concentration at 200 mm. Hg pressure. At the final liquor temperature of 120° C., in the evaporator, 0.29 lb. $Na_2SO_4$/100 lbs. actual NaSCN is held in solution. The evaporator effluent (61% NaSCN) is slowly cooled to 35° C. with seeding with a few crystals of $Na_2SO_4$; at 35° C. only 0.07 lb. $Na_2SO_4$/100 lbs. actual NaSCN remains in solution. Thus 0.215 lb. $Na_2SO_4$/100 lbs. actual NaSCN crystallizes out and is removed by filtration. Removal of $Na_2SO_4$ in this second step amounts to about 61.4% of the total original $Na_2SO_4$ present in the dilute NaSCN solution. The total removal of sodium sulfate in both steps is 80.0% of the original $Na_2SO_4$ content of the starting thiocyanate solution.

Example 8

A dilute NaSCN solution from a coagulating bath obtained as described in Example 7 and containing 0.35 lb. $Na_2SO_4$/100 lbs. actual NaSCN is used in this example. To this solution is added 0.00049 lb. mole of $Ba(OH)_2$. The pH of the resulting solution is 9. Activated carbon and diatomaceous earth are added to this solution, and the mixture is agitated for one hour and then filtered. The filtrate contains 0.270 lb. $Na_2SO_4$/100 lbs. NaSCN. This represents the removal of about 22.8% of the original $Na_2SO_4$ content of the NaSCN solution.

The solution is then evaporated, as in prior examples, to 62% NaSCN concentration at 200 mm. Hg pressure and a final liquor temperature of 122° C. in the evaporator. At this temperature $Na_2SO_4$ is soluble to the extent of 0.285 lb./100 lbs. actual NaSCN. The hot liquor is slowly cooled to 37° C. in a crystallizer. At 37° C. the concentrated NaSCN solution holds 0.065 lb. $Na_2SO_4$/100 lbs. actual NaSCN. The remaining portion of $Na_2SO_4$ or 0.205 lb. $Na_2SO_4$/100 lbs. actual NaSCN crystallizes out and is removed by filtration. This amount represents the removal of about 58.6% of the total $Na_2SO_4$ present in the dilute NaSCN solution. The amount of $Na_2SO_4$ removed by the combined steps represents about 81.4% of the original $Na_2SO_4$ content of the starting thiocyanate solution.

Example 9

A dilute NaSCN solution containing 0.37 lb. $Na_2SO_4$/100 lbs. actual NaSCN is treated with 0.00057 lb. mole of $Ba(OH)_2$ and 0.00114 lb. mole of $NH_4SCN$. The mixture is agitated for one hour at 20° C. The initial pH of the mixture is 8.5 and, after agitating for one hour, the pH is 7.5. (The high initial pH of 8.5 is due to the evolution of ammonia during the ammonium thiocyanate-barium hydroxide reaction. This pH is sufficient to precipitate dissolved iron as the insoluble hydroxide so that any iron impurity also can be removed in the subsequent filtration step.) Activated carbon (decolorizing carbon) and diatomaceous earth are added and the resulting mixture is filtered as in Examples 5, 6 and 7. The filtrate contains 0.29 lb. $Na_2SO_4$/100 lbs. actual NaSCN, which represents the removal of about 21.6% of the original $Na_2SO_4$ content of the NaSCN solution.

The solution is evaporated, as in prior examples, to 61% NaSCN concentration at 200 mm. Hg pressure and a final liquor temperature of 120° C. in the evaporator. The hot liquor is then cooled to 35° C. in a crystallizer and seeded with a few crystals of $Na_2SO_4$. At this temperature the 61% NaSCN solution holds 0.07 lb. $Na_2SO_4$/100 lbs. actual NaSCN. The remaining portion of $Na_2SO_4$ or 0.22 lb. $Na_2SO_4$/100 lbs. actual NaSCN crystallizes out and is removed by filtration. This amount represents the removal of about 59.4% of the total $Na_2SO_4$ present in the dilute NaSCN solution. The amount of $Na_2SO_4$ removed by the combined steps represents about 81% of the original $Na_2SO_4$ content of the starting thiocyanate solution.

I claim:

1. A method of purifying an impure dilute aqueous sodium thiocyanate solution, formed in synthetic fiber spinning, to a degree of purity such that after concentration it can be used as the solvent component of a spinning solution that will not obstruct spinnerette openings by depositing impurities therein, which comprises evaporating water in a single heating step from an aqueous 2% to 20%, by weight, sodium thiocyanate solution from said source having a pH of at least 7.5 and containing small amounts of sodium sulfate and color-forming metallic compounds as impurities until the solution contains between about 56% and about 62% by weight of NaSCN and that part of the sodium sulfate which is in excess of the solubility of $Na_2SO_4$ in the solution after concentration has precipitated, transferring the resulting concentrated sodium thiocyanate solution in a precipitate-free condition to a cooling zone, cooling it in said zone to a temperature below 38° C. but above the freezing point of the concentrated thiocyanate solution and maintaining it at said temperature until substantially all of the residual sodium sulfate has separated therefrom, the aforesaid color-forming metallic compounds being removed in insoluble form from the sodium thiocyanate solution along with the sodium sulfate by reason of its alkaline condition.

2. A method as in claim 1 wherein the water is evaporated from the 2% to 20%, by weight, aqueous solution of sodium thiocyanate under reduced pressure to a maximum temperature not exceeding about 120° C.

3. The method of removing impurities from a 2% to 20%, by weight, aqueous solution of sodium thiocyanate containing sodium sulfate and other impurities which comprises admixing with said solution an amount of a water-soluble barium compound which is substantially less than the chemical equivalent amount required for converting all of the said sodium sulfate to barium sulfate, but which is sufficient to prevent the precipitation of sodium sulfate during subsequent concentration under heat of the said thiocyanate solution and bringing the said solution to a pH of at least 7.5 during said admixing; separating the precipitate comprising barium sulfate from the thusly treated thiocyanate solution; evaporating water from the barium sulfate-free thiocyanate solution, in a single heating step, until the solution contains between about 56% and about 62% by weight of NaSCN; transferring the resulting concentrated solution of sodium thiocyanate to a cooling zone; cooling the said solution in said zone to a temperature below 38° C. but above the freezing point of the concentrated thiocyanate solution, whereby sodium sulfate separates from the cooled solution; and removing the said sodium sulfate from the said solution.

4. A method as in claim 3 wherein the water-soluble barium compound is barium hydroxide.

5. A method as in claim 3 wherein the water-soluble barium compound is barium thiocyanate.

References Cited in the file of this patent

UNITED STATES PATENTS

| | | |
|---|---|---|
| 737,740 | Jacobs | Sept. 1, 1903 |
| 2,313,680 | Smith | Mar. 9, 1943 |
| 2,459,302 | Aronson | Jan. 18, 1949 |
| 2,575,238 | Stenger | Nov. 13, 1951 |